UNITED STATES PATENT OFFICE.

ERIK CHRISTIAN BAYER, OF COPENHAGEN, DENMARK.

PREPARING PUMICE-STONE FOR USE IN CONCRETE.

1,354,233.         Specification of Letters Patent.    Patented Sept. 28, 1920.

No Drawing.     Application filed November 15, 1919. Serial No. 338,405.

*To all whom it may concern:*

Be it known that I, ERIK CHRISTIAN BAYER, a subject of the King of Denmark, residing at No. 110, Nörrevoldgade, Copenhagen, in the Kingdom of Denmark, have invented certain new and useful Improvements in Preparing Pumice-Stone for Use in Concrete, of which the following is a specification.

As ordinary cement concrete for use in shipbuilding is a very heavy material, an attempt has been made to mix the cement with a light material, namely pumice stone, instead of the heavier materials, sand and gravel. It has been found, however, that pumice stone notwithstanding its otherwise suitable structure not being especially hygroscopic in spite of its great porosity, is too brittle a material to form a substitute for sand and gravel.

By treating pumice stone as hereinafter set forth, it can, however, undergo such an alteration that it becomes a very strong and thus an exceedingly suitable material for the manufacture of light concrete.

This treatment consists in crushing the pumice stone into particles of a size adapted to the best utilizing of the porosity (a complete crushing would not be favorable) after which the crushed pumice stone is heated in a furnace to a temperature of about 1000° C. The pumice stone, especially if rotary furnace is used, can thus be very quickly heated, and gradually, as the temperature rises, the hardness of the pumice stone is increased, as a certain contraction takes place in the material; at the same time that the outer, open pores are closed, giving a very hard and sharp-edged surface, then, the temperature approximately reaching the melting-point, the separate fragments become strong and hard as glass, but in their interior they are so porous that the specific gravity, with suitable coarseness of the gravel, is about 40% less than that of ordinary sand, and still less at a somewhat lower temperature.

If desired the pumice stone may be burnt in the manner described, before being crushed, in which case the resulting product will have rather sharper edges than in the case where the crushing is carried out before the burning operation.

I claim:

1. Method of treating pumice stone so that it is rendered suitable for light concrete, characterized in that the pumice stone is crushed, and the separate fragments are subjected to a temperature of about 1000° C. and higher up to melting point, whereby there occurs a contraction in each separate fragment, which contraction according to the height of temperature, increases the hardness until glass-hardness and whereby the outer pores in reaching the melting point are completely closed through a superficial melting while each separate piece still remains porous inside.

2. In the method set forth in claim 1, the modification that the pumice stone is burnt before it is crushed.

In testimony whereof I affix my signature in the presence of two witnesses.

ERIK CHRISTIAN BAYER.

Witnesses:
    A. CHRISTOFFERSEN,
    H. B. EMERT.